United States Patent
Bolton et al.

(10) Patent No.: US 10,641,744 B2
(45) Date of Patent: May 5, 2020

(54) METHODS AND SYSTEMS FOR DETERMINING BOND EFFICACY USING METALLIC REFLECTORS AND ULTRASONIC INSPECTION

(71) Applicant: The Boeing Company, Chicago, IL (US)

(72) Inventors: Joseph Bolton, Newalla, OK (US); Keith Humfeld, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 136 days.

(21) Appl. No.: 15/967,111

(22) Filed: Apr. 30, 2018

(65) Prior Publication Data

US 2019/0331647 A1  Oct. 31, 2019

(51) Int. Cl.
*G01N 29/44* (2006.01)

(52) U.S. Cl.
CPC . *G01N 29/4427* (2013.01); *G01N 2291/0231* (2013.01)

(58) Field of Classification Search
CPC .... G01N 29/44; G01N 29/4427; G01N 29/48; G01N 29/043; G01N 29/11; G01N 2291/0231; G01N 2291/0251; G01N 2291/4409; G01N 2291/4436; G01N 2291/0234; G01N 2291/025; G01N 2291/044
USPC .................. 73/588, 583, 597, 598, 599, 600
See application file for complete search history.

(56) References Cited

U.S. PATENT DOCUMENTS

| | | | |
|---|---|---|---|
| 5,876,532 A | 3/1999 | Billarant | |
| 8,647,548 B1 | 2/2014 | Humfeld | |
| 8,764,929 B2 * | 7/2014 | Dan-Jumbo | C09J 5/02 156/281 |
| 9,724,845 B2 | 8/2017 | Humfeld | |

(Continued)

OTHER PUBLICATIONS

David Moore, Dennis Roach, Ciji Nelson, Non-Destructive Inspection of Adhesive Bonds in Metal-Metal Joints, 2009 DOE Vehicle Technologies Program Review (PowerPoint Presentation dated May 21, 2009).

*Primary Examiner* — Suman K Nath
(74) *Attorney, Agent, or Firm* — McDonnell Boehnen Hulbert & Berghoff LLP

(57) ABSTRACT

In an example, a method of determining bonding efficacy of a composite laminate is described. The method includes disposing a metallic substance on a bonding agent, coupling the bonding agent having the metallic substance between a first and second layer of composite material to form a composite assembly, heating and curing the composite assembly to produce the composite laminate, receiving a post-curing interference signal that indicates a post-curing degree of constructive interference resulting from transmission of ultrasonic waves into the composite laminate, comparing the post-curing interference signal to a pre-curing interference signal that indicates a baseline degree of constructive interference resulting from transmission of ultrasonic waves into the composite assembly, and determining the bond efficacy of the composite laminate based on the comparison, where a reduction in constructive interference between the pre-curing interference signal and the post-curing interference signal is indicative of the bond efficacy.

20 Claims, 9 Drawing Sheets

(56) References Cited

U.S. PATENT DOCUMENTS

| | | |
|---|---|---|
| 9,731,453 B2 | 8/2017 | Humfeld et al. |
| 2006/0123912 A1* | 6/2006 | Karasawa ............ G01N 29/043 73/602 |
| 2014/0346405 A1* | 11/2014 | Ferguson ............... G01N 29/30 252/408.1 |
| 2015/0198520 A1* | 7/2015 | Slocum ................. B32B 15/095 428/425.8 |

* cited by examiner

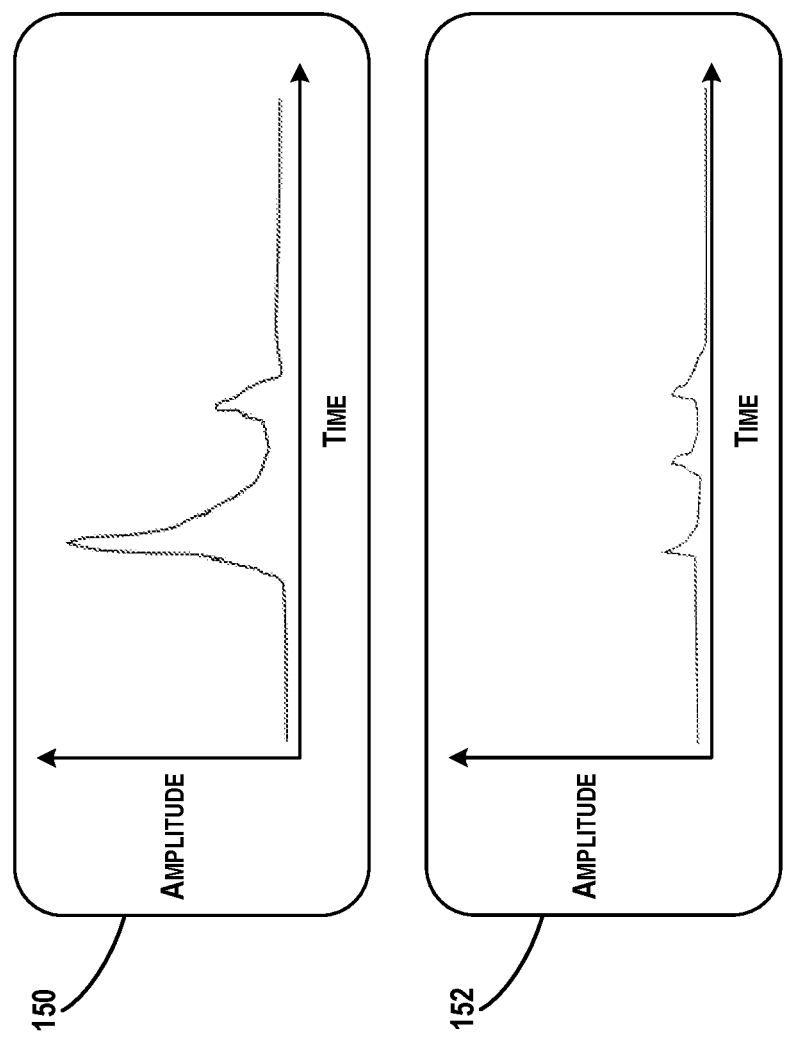

METHODS AND SYSTEMS FOR DETERMINING BOND EFFICACY USING METALLIC REFLECTORS AND ULTRASONIC INSPECTION

FIELD

The present disclosure relates generally to nondestructive inspection of composite laminates, and more particularly, to methods of using ultrasonic inspection and metallic reflectors to help determine a bond efficacy of a bonding agent within a composite laminate.

BACKGROUND

Composite laminates can be used in the manufacture of aircraft. An example composite laminate can be created by inserting a bonding agent between two layers of a composite material to form a composite assembly, applying pressure to where the bond is to be formed, applying heat to melt the bonding agent, and then curing (i.e., hardening) the bonding agent to complete the bond. To achieve a strong bond, the bonding agent while melting ideally should flow and establish intimate contact with each of the two surfaces between which the bonding agent is placed. Strongly-bonded composite laminates improve the integrity of the structures manufactured from such laminates.

Existing methods for testing a bond efficacy of a composite laminate typically involve mechanical testing of the laminate to its design limit. This can be a lengthy testing process that can require high-strength testing rigs and holding fixtures that are unique to each composite assembly that is to be laminated. In addition, when bonds are weak and improperly formed, such testing can irrevocably damage the assembly and/or create safety risks associated with the rigs or fixtures. Further, it can be difficult or impossible to repair failed bonds when the assembly is damaged during testing.

What is needed are systems and methods for determining a bond efficacy of a composite laminate that are efficient, less expensive, less risky, and nondestructive.

SUMMARY

In an example, a method of determining bonding efficacy of a composite laminate is described. The method comprises disposing a metallic substance on a bonding agent, coupling the bonding agent having the metallic substance between a first layer of composite material and a second layer of composite material to form a composite assembly, heating and curing the composite assembly to produce the composite laminate, receiving a post-curing interference signal that indicates a post-curing degree of constructive interference resulting from transmission of ultrasonic waves into the composite laminate, comparing the post-curing interference signal to a pre-curing interference signal that indicates a baseline degree of constructive interference resulting from transmission of ultrasonic waves into the composite assembly, and determining the bond efficacy of the composite laminate based on the comparison, where a reduction in constructive interference between the pre-curing interference signal and the post-curing interference signal is indicative of the bond efficacy.

In another example, a system is described comprising a computing device having a processor and memory storing instructions executable by the processor to cause a transducer to transmit ultrasonic waves into a composite assembly, where the composite assembly comprises a bonding agent inserted between a first layer of composite material and a second layer of composite material, and where a metallic substance is disposed on the bonding agent, receive a pre-curing interference signal that indicates a baseline degree of constructive interference resulting from the transmission of ultrasonic waves into the composite assembly, cause the transducer to transmit ultrasonic waves into a composite laminate produced by heating and curing the composite assembly, receive a post-curing interference signal that indicates a post-curing degree of constructive interference resulting from the transmission of ultrasonic waves into the composite laminate, compare the post-curing interference signal to the pre-curing interference signal, and determine a bond efficacy of the composite laminate based on the comparison, where a reduction in constructive interference between the pre-curing interference signal and the post-curing interference signal is indicative of the bond efficacy.

In another example, non-transitory computer readable medium is described having stored thereon instructions, that when executed by one or more processors of a computing device, cause the computing device to perform functions. The functions comprise causing a transducer to transmit ultrasonic waves into a composite assembly, where the composite assembly comprises a bonding agent inserted between a first layer of composite material and a second layer of composite material, and where a metallic substance is disposed on the bonding agent, receiving a pre-curing interference signal that indicates a baseline degree of constructive interference resulting from the transmission of ultrasonic waves into the composite assembly, causing the transducer to transmit ultrasonic waves into a composite laminate produced by heating and curing the composite assembly, receiving a post-curing interference signal that indicates a post-curing degree of constructive interference resulting from the transmission of ultrasonic waves into the composite laminate, comparing the post-curing interference signal to the pre-curing interference signal, and determining a bond efficacy of the composite laminate based on the comparison, where a reduction in constructive interference between the pre-curing interference signal and the post-curing interference signal is indicative of the bond efficacy.

The features, functions, and advantages that have been discussed can be achieved independently in various examples or may be combined in yet other examples. Further details of the examples can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

FIG. 6 illustrates an example pre-curing interference signal and an example post-curing interference signal, according to an example implementation.

DETAILED DESCRIPTION

Figure 1:
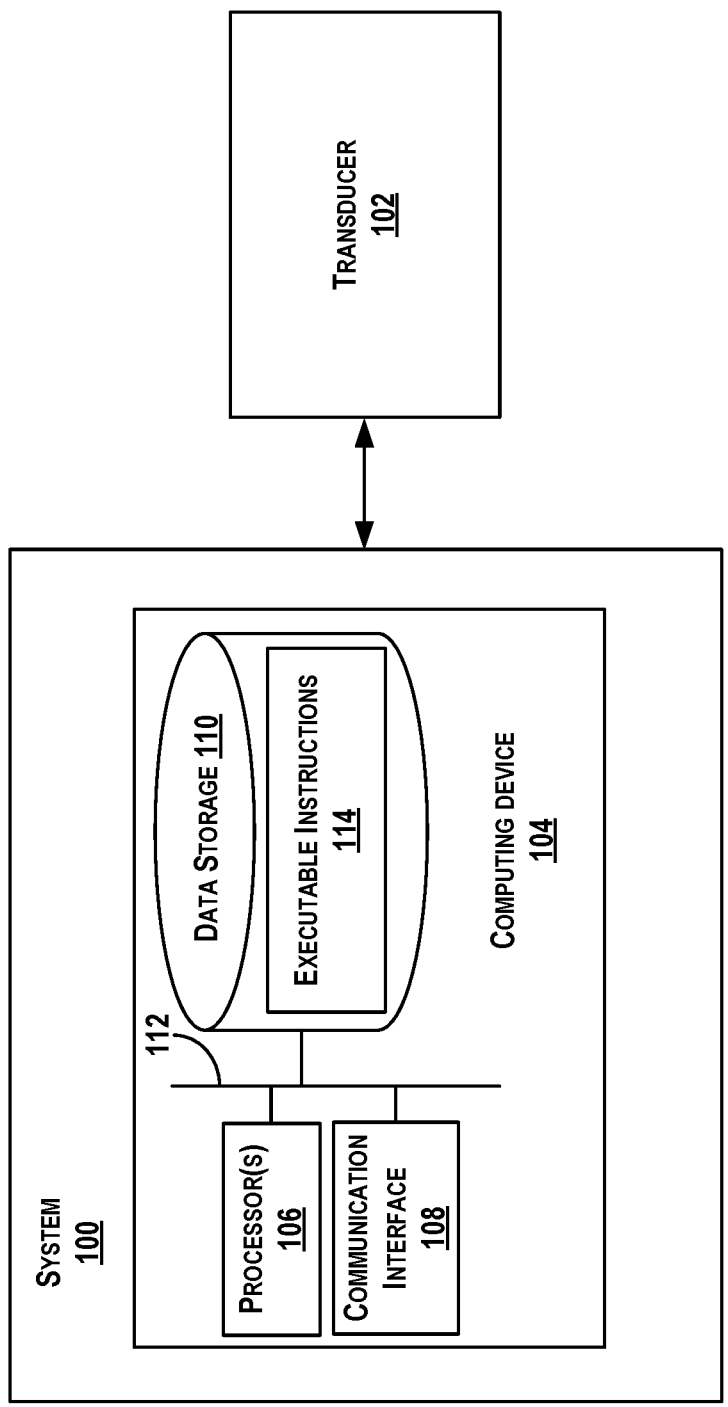
FIG. 1 illustrates a block diagram of an example system, according to an example implementation.

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Within examples, methods and systems for determining bond efficacy using metallic reflectors and ultrasonic inspection are described. A metallic substance may be disposed on a bonding agent, and the bonding agent can then be inserted between a first and second layer of composite material to form a composite assembly. Before the bonding agent is heated and cured, nondestructive ultrasonic inspection can be performed on the composite assembly. Due to the reflective qualities of the metallic substance disposed on the bonding agent, ultrasonic waves transmitted into the composite assembly may reflect off the metallic substance and constructively interfere with the transmitted ultrasonic waves. The resulting signal (hereinafter referred to as a "pre-curing interference signal") may thus indicate a baseline degree of constructive interference between the ultrasonic waves that are transmitted into the composite assembly and the ultrasonic waves that are reflected off the metallic substance. However, it should be understood that the transmitted and reflected ultrasonic waves may also interfere in other ways as well, such as destructively, or in another manner (e.g., such that a net amplitude is between zero and a sum of the waves' amplitudes).

When the bonding agent of the composite assembly is then heated, the bonding agent may flow, causing displacements of particles that make up the metallic substance. The composite assembly can then be cured to complete the formation of a composite laminate. Due to the displacement of particles of the metallic substance caused by the flow, the degree of constructive interference between the transmitted ultrasonic waves and the ultrasonic waves reflected off the displaced metallic substance will change.

Thus, in accordance with some examples of the methods and systems, another interference signal is obtained after the bonding agent is heated and cured, and this signal (hereinafter referred to as a "post-curing interference signal") is compared with the pre-curing interference signal as a basis for determining a bond efficacy of the composite laminate. In other words, the two signals are compared to determine how good of a bond was formed when the bonding agent flowed. For example, if the bonding agent does not flow much (i.e., does not establish intimate contact with each of the two surfaces between which the bonding agent is placed), the metallic substance will not be displaced much, which results in a minimal difference between the pre-curing interference signal and the post-curing interference signal, thus indicating a weaker bond with a higher likelihood of causing the composite laminate to delaminate. By contrast, if the bonding agent flows well (i.e., establishes intimate contact with each of the two surfaces between which the bonding agent is placed), particles of the metallic substance will be displaced enough to result in a larger difference between the pre-curing interference signal and the post-curing interference signal that indicates a stronger bond with a lower likelihood of causing the composite laminate to delaminate.

To facilitate this comparison, the metallic substance is disposed on the bonding agent in such a way that maximizes the baseline degree of constructive interference indicated by the pre-curing interference signal. In addition, the metallic substance can be disposed on the bonding agent in such a way that, when the bonding agent is heated and particles of the metallic substance are displaced, the ultrasonic waves reflected off the metallic substance will constructively interfere with the transmitted ultrasonic waves to a much smaller degree in comparison to the pre-curing interference signal. The loss of a strong interference signal and reduction in constructive interference between the pre-curing interference signal and the post-curing interference signal is indicative of the bond efficacy of the composite laminate, particularly indicating that the bonding agent flowed well and that complete bonding has occurred, and thereby providing a reliable manner in which to determine the bonding efficacy of the composite laminate. Manners in which to maximize the baseline degree of constructive interference indicated by the pre-curing interference signal are described in more detail below, along with other aspects of the methods and systems.

Example implementations are discussed herein primarily with respect to using constructive interference as a manner of determining bond efficacy. However, it should be understood that, in other implementations, interference signals can indicate other forms of interference (e.g., destructive interference), and such other forms of interference can likewise be used to determine bond efficacy in manners similar to those described herein.

The methods and systems can utilize a nondestructive inspection technique (i.e., ultrasound) in this manner to efficiently determine bond efficacy while eliminating the risks from using mechanical equipment such as rigs and fixtures to test bond efficacy, as well as the safety risks that might accompany such testing. The methods and systems can also reduce costs associated with existing testing techniques, as well as costs associated with repairing composite assemblies that are damaged as a result of such existing techniques. In addition, the method and systems can reliably determine whether composite laminates have a good bond, and thus such composite laminates can be reliably and economically used in designing aircraft components or components for other industries.

Referring now to the figures, FIG. 1 illustrates a block diagram of an example system 100, according to an example implementation. Specifically, the system 100 is configured for use in performing nondestructive ultrasonic inspection on a composite assembly and a composite laminate and determining a bond efficacy of the composite laminate. The system 100 is shown to be in communication with a transducer 102. While the transducer 102 is shown as a separate component from the system 100, the transducer 102 could be included as part of the system 100 in some examples.

The transducer 102 is an ultrasonic transceiver configured to transmit ultrasonic waves, receive ultrasonic waves, and convert received ultrasonic waves into signals. Within examples described herein, the transducer 102 is configured to transmit ultrasonic waves into a composite assembly having a bonding agent on which a metallic substance is disposed, as well as to transmit ultrasonic waves into a composite laminate produced by heating and curing the composite assembly. In either situation, upon receipt of constructively interfering ultrasonic waves, the transducer 102 converts the received ultrasonic waves into an interference signal, either a pre-curing interference signal or a post-curing interference signal, depending on when ultrasonic inspection occurs.

The transducer 102 may be configured to transmit ultrasonic waves at a variety of frequencies, and thus transmit ultrasonic waves having a variety of wavelengths. Further, the transducer 102 could include a single probe for inspecting a single location on a composite assembly and composite laminate at a time. In examples where the composite assembly and composite laminate has a large surface area, the transducer 102 could include an array of probes for inspecting multiple locations on the composite assembly or the composite laminate at a time.

The system 100 includes a computing device 104 having one or more processors 106, a communication interface 108, and data storage 110, each connected to a communication bus 112. The computing device 104 may also include hardware to enable communication within the computing device and between the computing device and other devices (not shown). The hardware may include transmitters, receivers, and antennas, for example.

The communication interface 108 may be a wireless interface and/or one or more wireline interfaces that allow for both short-range communication and long-range communication to one or more networks or to one or more remote devices. Such wireless interfaces may provide for communication under one or more wireless communication protocols, Bluetooth, WiFi (e.g., an institute of electrical and electronic engineers (IEEE) 802.11 protocol), Long-Term Evolution (LTE), cellular communications, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network. Thus, the communication interface 108 may be configured to receive input data from one or more devices, such as the transducer 102, and may also be configured to send output data to other devices, such as the transducer 102.

The data storage 110 may include or take the form of memory, such as one or more computer-readable storage media that can be read or accessed by the one or more processors 106. The computer-readable storage media can include volatile and/or non-volatile storage components, such as optical, magnetic, organic or other memory or disc storage, which can be integrated in whole or in part with the one or more processors 106. The data storage 110 is considered non-transitory computer readable media. In some examples, the data storage 110 can be implemented using a single physical device (e.g., one optical, magnetic, organic or other memory or disc storage unit), while in other examples, the data storage 110 can be implemented using two or more physical devices.

The data storage 110 thus is a non-transitory computer readable storage medium, and executable instructions 114 are stored thereon. The executable instructions 114 include computer executable code.

The one or more processors 106 may be general-purpose processors or special purpose processors (e.g., digital signal processors, application specific integrated circuits, etc.). The one or more processors 106 may receive inputs from the communication interface 108 as well as from other sensors and/or from the transducer 102, and process the inputs to generate outputs that are stored in the data storage 110 and used to determine a bond efficacy of a composite laminate. The one or more processors 106 can be configured to execute the executable instructions 114 (e.g., computer-readable program instructions) that are stored in the data storage 110 and are executable to provide the functionality of the computing device 104 described herein.

Within one example, in operation, when the executable instructions 114 are executed by the one or more processors 106 of the computing device 104, the one or more processors 106 are caused to perform functions including to cause a transducer to transmit ultrasonic waves into a composite assembly, where the composite assembly comprises a bonding agent inserted between a first layer of composite material and a second layer of composite material, and where a metallic substance is disposed on the bonding agent, receive a pre-curing interference signal that indicates a baseline degree of constructive interference resulting from the transmission of ultrasonic waves into the composite assembly, cause the transducer to transmit ultrasonic waves into a composite laminate produced by heating and curing the composite assembly, receive a post-curing interference signal that indicates a post-curing degree of constructive interference resulting from the transmission of ultrasonic waves into the composite laminate, compare the post-curing interference signal to the pre-curing interference signal, and determine a bond efficacy of the composite laminate based on the comparison, where a reduction in constructive interference between the pre-curing interference signal and the post-curing interference signal is indicative of the bond efficacy.

Figure 2:
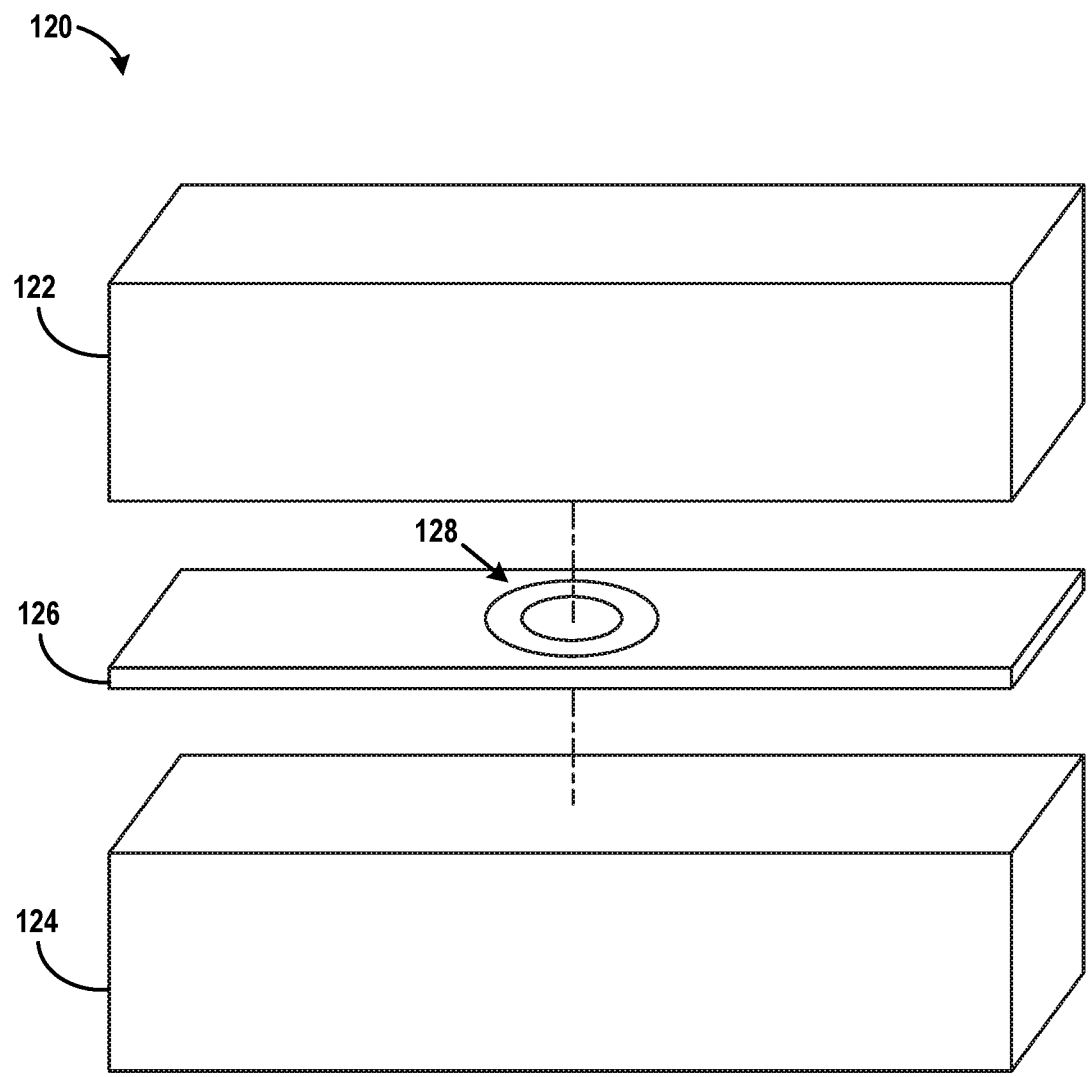
FIG. 2 illustrates an exploded view of an example composite assembly, according to an example implementation.

Next, FIG. 2 illustrates an exploded view of an example composite assembly 120, according to an example implementation. The composite assembly 120 includes a first layer of composite material 122, a second layer of composite material 124, and a bonding agent 126. In addition, a metallic substance 128 is disposed on the bonding agent 126.

The first layer of composite material 122 and/or the second layer of composite material 124 may be a carbon fiber layer or a layer of another type of composite material.

The bonding agent 126 may be an adhesive film. In some examples, the adhesive film could be coupled between the first and second layers of composite material 122 and 124 by adhering a first side of the adhesive film to one of the two layers, applying pressure, removing a backing paper from a second side of the adhesive film, and then adhering the second side of the adhesive film to the other of the two layers. The bonding agent 126 could be another type of adhesive and/or could be coupled between the first and second layers of composite material 122 and 124 in other ways.

The metallic substance 128 may be a metallic ink, such as copper ink or aluminum ink, which can be printed onto the bonding agent 126 by a printer configured for such a purpose. Use of metallic ink can provide an accurate, simple, and cheap way to dispose the metallic substance 128 on the bonding agent 126. However, in other examples, other types of metallic substances could be used. For instance, a foil stamping process could be used to dispose foil onto the bonding agent 126.

Within examples described herein, the metallic substance can be disposed on the bonding agent in a particular form (e.g., a pattern) that is selected to maximize a baseline degree of constructive interference indicated by a pre-curing interference signal.

One manner in which to accomplish this is to dispose the metallic substance in a circle. In particular, the metallic substance can be disposed in a circle that has a radius such that a distance from a reference location on a surface of the composite assembly at which ultrasonic waves having a particular wavelength ($\lambda$) are transmitted into the composite assembly to each point along the circle is substantially equal to one another. That way, when a transducer is placed at the reference location (assuming uniform thickness of one of the two layers of composite material at the reference location), ultrasonic waves having the particular wavelength that are transmitted by the transducer, reflected off the circle (i.e., reflected off particles of the metallic substance arranged in the circle) and returned to the transducer will have substantially the same time of flight, which causes an approximate maximum baseline degree of constructive interference to occur.

For the distance from the reference location to each point along the circle to be substantially equal to one another, the reference location may be a point on the surface of the composite assembly that is approximately directly above a center of the circle.

Figure 3:
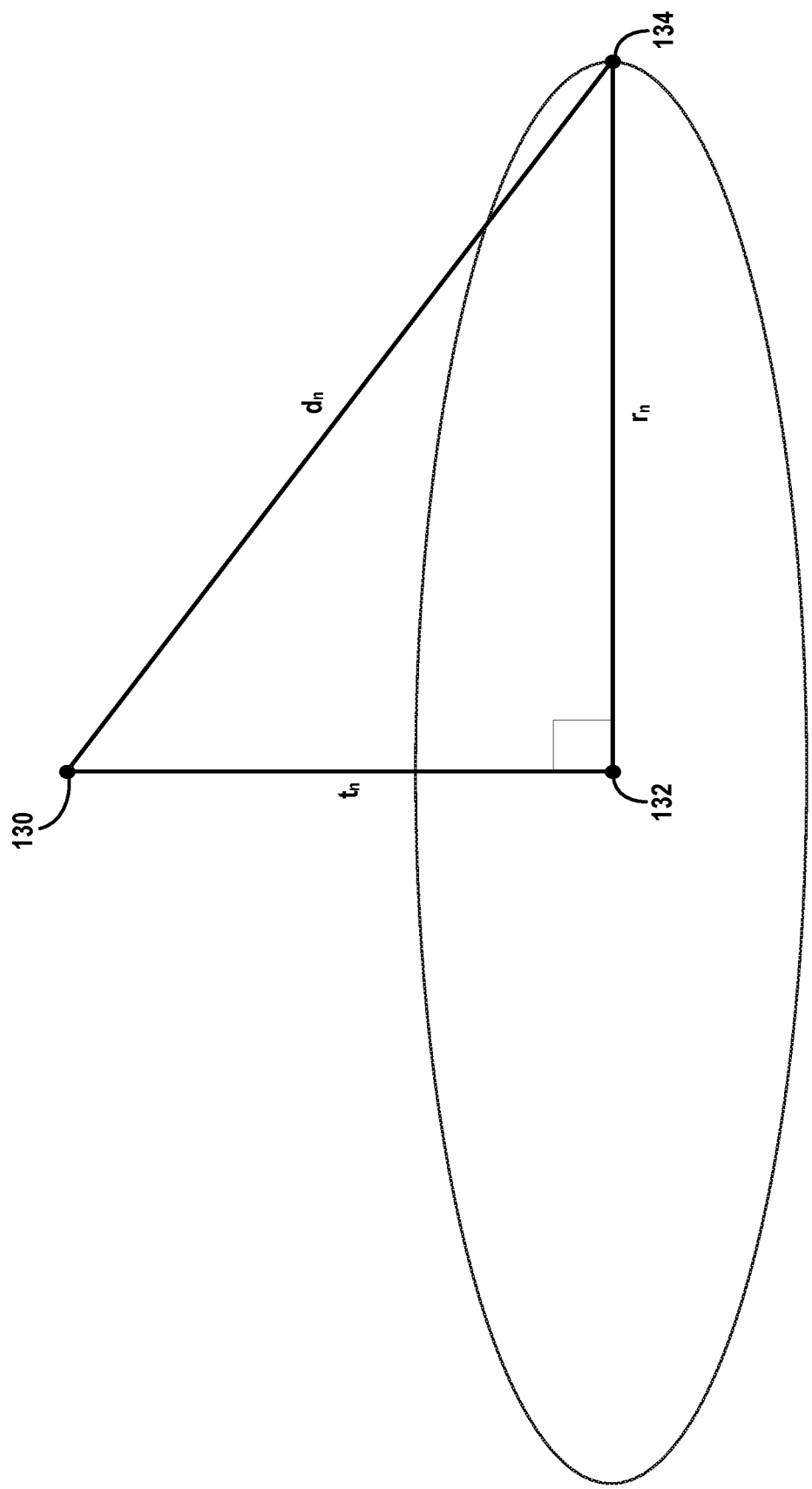
FIG. 3 illustrates a relationship between a first point representing a reference location on a surface of a composite assembly, a second point representing a center of a circle of a metallic substance, and a third point representing a point along the circle of the metallic substance, according to an example implementation.

An example of how to determine a radius for such a circle is described with respect to FIG. 3. FIG. 3 illustrates a relationship between a first point 130 representing a reference location on a surface of a composite assembly, a second point 132 representing a center of a circle of a metallic substance, and a third point 134 representing a point along the circle of the metallic substance, according to an example implementation. In addition, FIG. 3 illustrates a thickness ($t_n$) of the layer of composite material (e.g., the first layer of composite material 122) between the metallic substance and the reference location, a radius ($r_n$) of the circle, and a distance ($d_n$) between the reference location and the point along the circle.

The example illustrated in FIG. 3 assumes that the reference location is directly above the center of the circle, that the ultrasonic waves that are transmitted into the composite assembly to obtain the pre-curing interference signal have a wavelength of $\lambda$, and that the layer of composite material between the metallic substance and the reference location has a uniform thickness of $\lambda$ (i.e., $t_n = \lambda$).

Forms or patterns other than a circle can be selected as well, but might not maximize the baseline degree of constructive interference to the extent that a circle will.

The pre-curing interference signal may be enhanced further by disposing the metallic substance on the bonding agent in multiple concentric circles. For example, a maximum baseline degree of constructive interference will occur when a difference in the respective distances for any two concentric circles is substantially equal to an integer multiple of half the wavelength $\lambda$. In other words, given distance $d_n$ for a first circle, and given a distance $d_m$ for a second circle that is concentric with the first circle, the maximum baseline degree of constructive interference will occur when $(d_n - d_m)$ is substantially equal to $0.5\lambda$, $1.0\lambda$, $1.5\lambda$, $2.0\lambda$, $2.5\lambda$, or another integer multiple of half of $\lambda$. Thus, given $d_m$, and given a value for $(d_n - d_m)$ (e.g., $1.0\lambda$, $1.5\lambda$, $2.0\lambda$, etc.), a value for $d_n$ can be calculated. Then, the equation for calculating $r_n$ is the Pythagorean equation, shown as follows, where the thickness $t_n$ is equal to $\lambda$:

$$r_n^2 + \lambda^2 = d_n^2 \qquad \text{Equation (1)}$$

Thus, the metallic substance can be disposed on the bonding agent in one or more concentric circles such that each circle has a radius determined for the circle as described above.

Within examples, the metallic substance could be disposed such that at least one of the one or more concentric circles has a single, continuous circular path. As shown in FIG. 2, for instance, the metallic substance 128 is disposed on the bonding agent 126 in two concentric circles, including an inner circle and an outer circle, each having a single continuous circular path. A continuous circular path can have a substantially uniform width in a range between 10 and 500 nanometers. Alternatively, a continuous circular path can have a substantially uniform width in a range between 1 and 50 micrometers.

Figure 4:
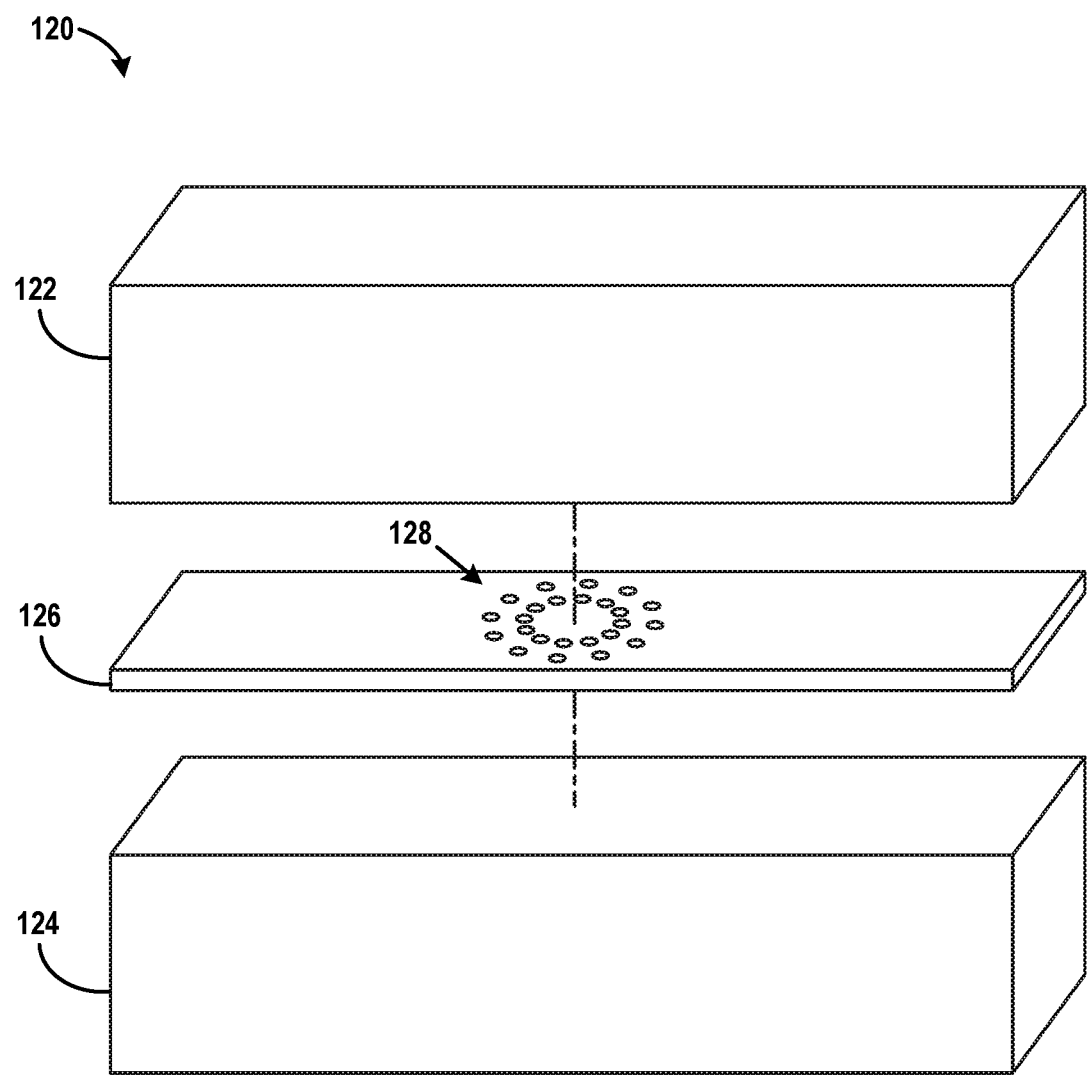
FIG. 4 illustrates an exploded view of a variation of the example composite assembly of FIG. 2, according to an example implementation.

Within other examples, the metallic substance could be disposed such that at least one of the one or more concentric circles is comprised of a plurality of discrete markings arranged in a circular path. An example of this is shown in FIG. 4. FIG. 4 illustrates an exploded view of a variation of the example composite assembly 120 of FIG. 2, according to an example implementation. As shown in FIG. 4, the metallic substance 128 is disposed on the bonding agent 126 in two concentric circles, including an inner circle and an outer circle, each being comprised of a plurality of discrete markings arranged in a circular path.

In such examples, the metallic substance could be disposed in the one or more concentric circles such that at least one of the one or more concentric circles is comprised of the plurality of discrete markings arranged in the circular path and each marking of the plurality of discrete markings has a diameter in a range between 10 and 500 nanometers. Alternatively, the metallic substance could be disposed in the one or more concentric circles such that at least one of the one or more concentric circles is comprised of the plurality of discrete markings arranged in the circular path and each marking of the plurality of discrete markings has a diameter in a range between 1 and 50 micrometers. Each such marking may be small enough such that its individual ultrasonic response is below a signal-to-noise ratio of the transducer. Within other examples, the plurality of markings of a particular circle could include a combination of markings having a diameter in the nanometer range and markings having a diameter in the micrometer range.

When a composite assembly has a large surface area, the metallic substance can be disposed on the bonding agent such that multiple sets of one or more concentric circles (or other patterns designed to provide a high baseline degree of constructive interference) of the metallic substance are disposed at various locations on the bonding agent. Each such location can thus be inspected to determine a bond efficacy of the composite laminate at that location. In such scenarios, each set of one or more concentric circles (or other patterns) can be separated from one another by a predetermined distance. In any event, in such scenarios, for a given set of one or more concentric circles (or other patterns), the set should be far-enough separated from other sets such that the ultrasonic response from the set is detected before any ultrasonic response from any portion of the nearest neighboring sets. In other words, the set should be far enough away from a neighboring set so that the difference between the time of flight of the ultrasonic waves for the set and the time of flight of the ultrasonic waves for the neighboring set is large enough so that the system can accurately distinguish the ultrasonic response from the set from the ultrasonic response from the neighboring set. As such, the existence of neighboring sets would not diminish the bond efficacy determination with respect to the set.

Figure 5A:
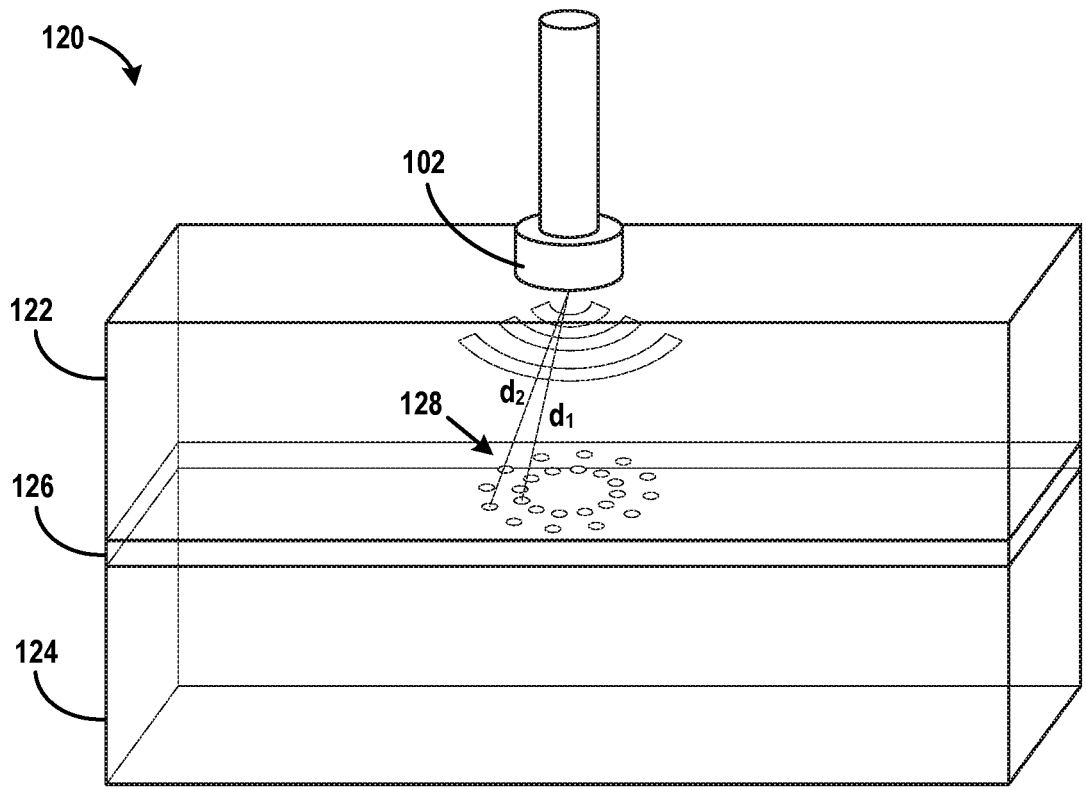
FIG. 5A illustrates an assembled view of the example composite assembly of FIG. 4, according to an example implementation.

FIG. 5A illustrates an assembled view of the example composite assembly 120 of FIG. 4, according to an example implementation. In addition, FIG. 5A illustrates the transducer 102, which is placed at the reference location and used for ultrasonic inspection of the composite assembly 120. As shown, for example, the reference location is located at a distance $d_1$ from each of the plurality of discrete markings of the inner circle of the metallic substance, and is located at a distance $d_2$ from each of the plurality of discrete markings of the outer circle of the metallic substance. These distances, along with the thickness of the first layer of composite material 122 and the particular wavelength of the ultrasonic waves that are transmitted into the composite assembly, can be used to determine the radii of the inner and outer circles in the manner described above.

Within examples, the computing device 104 shown in FIG. 1 causes the transducer 102 to transmit ultrasonic waves into the composite assembly 120. As a result, a baseline degree of constructive interference will occur, and the computing device 104 will receive a pre-curing interference signal (e.g., to which the transducer 102 converts constructively-interfering ultrasonic waves) that indicates the baseline degree of constructive interference.

Figure 5B:
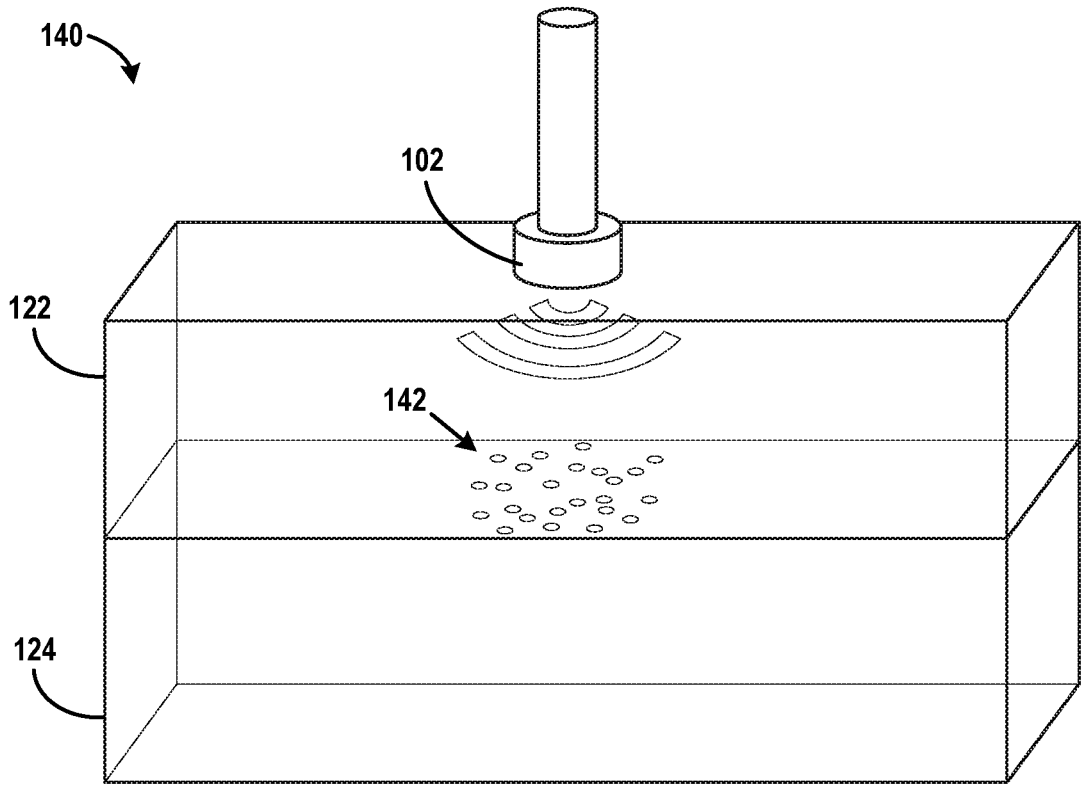
FIG. 5B illustrates the composite laminate produced by heating and curing the bonding agent of the example composite assembly of FIG. 4, according to an example implementation.

After the pre-curing interference signal is obtained, the bonding agent 126 of the composite assembly 120 is heated. As described above, when the bonding agent 126 is heated, the bonding agent 126 will flow, causing displacement of particles that make up the metallic substance 128. The composite assembly is then cured to produce a composite laminate 140. The composite laminate 140 is shown in FIG. 5B. Also shown in FIG. 5B are displaced metallic particles 142 as a result of the heating. The displaced metallic particles 142 will thus cause a reduction in constructive interference.

As such, the computing device 104 shown in FIG. 1 then causes the transducer 102 to transmit ultrasonic waves into the composite laminate 140. As a result, a post-curing degree of constructive interference will occur, and the computing device 104 will receive a post-curing interference signal (e.g., to which the transducer 102 converts constructively-interfering ultrasonic waves) that indicates a post-curing degree of constructive interference resulting from the transmission of ultrasonic waves into the composite laminate 140.

FIG. 6 illustrates an example pre-curing interference signal 150 and an example post-curing interference signal 152, according to an example implementation. More specifically, FIG. 6 illustrates the pre-curing interference signal 150 resulting from ultrasonic inspection of the composite assembly 120 and the post-curing interference signal 152 resulting from ultrasonic inspection of the composite laminate 140.

The computing device 104 then compares the post-curing interference signal 152 to the pre-curing interference signal 150. Based on the comparison, the computing device 104 then determines a bond efficacy of the composite laminate 140.

Within examples, the computing device 104 can compare the post-curing interference signal 152 to the pre-curing interference signal 150 by determining a ratio of the pre-curing interference signal 150 to the post-curing interference signal 152, and then comparing the ratio to a bond efficacy threshold. For example, the computing device 104 could determine the ratio to be a ratio of a maximum amplitude of the pre-curing interference signal 150 to a maximum amplitude of the post-curing interference signal 152. As another example, the computing device 104 could determine the ratio to be a ratio of an average amplitude of the pre-curing interference signal 150 over a sample period of time to an average amplitude of the post-curing interference signal 152 over a sample period of time. Other examples are possible as well.

As discussed above, strong bonding is caused by flow of the bonding agent 126, which displaces the metallic particles, thereby causing a reduction in the amplitude of the interference signal. Further, amplitude can be used as a measure of the respective degree of constructive interference present in each of the pre-curing and post-curing interference signals. Thus, if the ratio of the post-curing interference signal amplitude to the pre-curing interference signal amplitude is lower than the bond efficacy threshold, the computing device 104 can determine that a strong bond has occurred, and thus that the composite laminate has a lower likelihood of delaminating.

The bond efficacy threshold can be a value that indicates a strong bond. As an example, such a value can be in a range of 0.8 to 0.95. Thus, in a more particular example, if the ratio of the post-curing interference signal amplitude to the pre-curing interference signal amplitude is lower than 0.8, the computing device 104 can determine that a strong bond has occurred, and thus that the composite laminate has a lower likelihood of delaminating. Other examples are possible as well.

Further, the computing device 104 could compare the post-curing interference signal 152 to the pre-curing interference signal 150 in other manners as well.

A reduction in constructive interference between the pre-curing interference signal 150 and the post-curing interference signal 152 is indicative of the bond efficacy. In particular, a greater reduction in the constructive interference (which results in a higher ratio of the pre-curing interference signal 150 to the post-curing interference signal 152) is indicative of a stronger bond and thus a lower likelihood of the composite laminate delaminating, whereas a lesser reduction in the constructive interference (which results in a lower ratio of the pre-curing interference signal 150 to the post-curing interference signal 152) is indicative of a weaker bond and thus a higher likelihood of the composite laminate delaminating. As shown in FIG. 6, for example, the amplitude of the post-curing interference signal 152 is much less than the amplitude of the pre-curing interference signal 150, which indicates a strong bond.

Within examples described herein, there may be scenarios in which functions for using ultrasonic inspection to determine the pre-curing interference signal need not be performed. For instance, the computing device 104 can receive the pre-curing interference signal from another computing device. This pre-curing interference signal can be a pre-curing interference signal obtained via ultrasonic inspection by the other computing device. Alternatively, the computing device 104 or other device can use parameters of the composite assembly (e.g., the thickness, the radius or radii of one or more concentric circles) as a basis to determine an estimated pre-curing interference signal (or, more particularly, an estimated maximum amplitude) indicative of an estimated baseline degree of constructive interference that could occur given the parameters.

Figure 7:
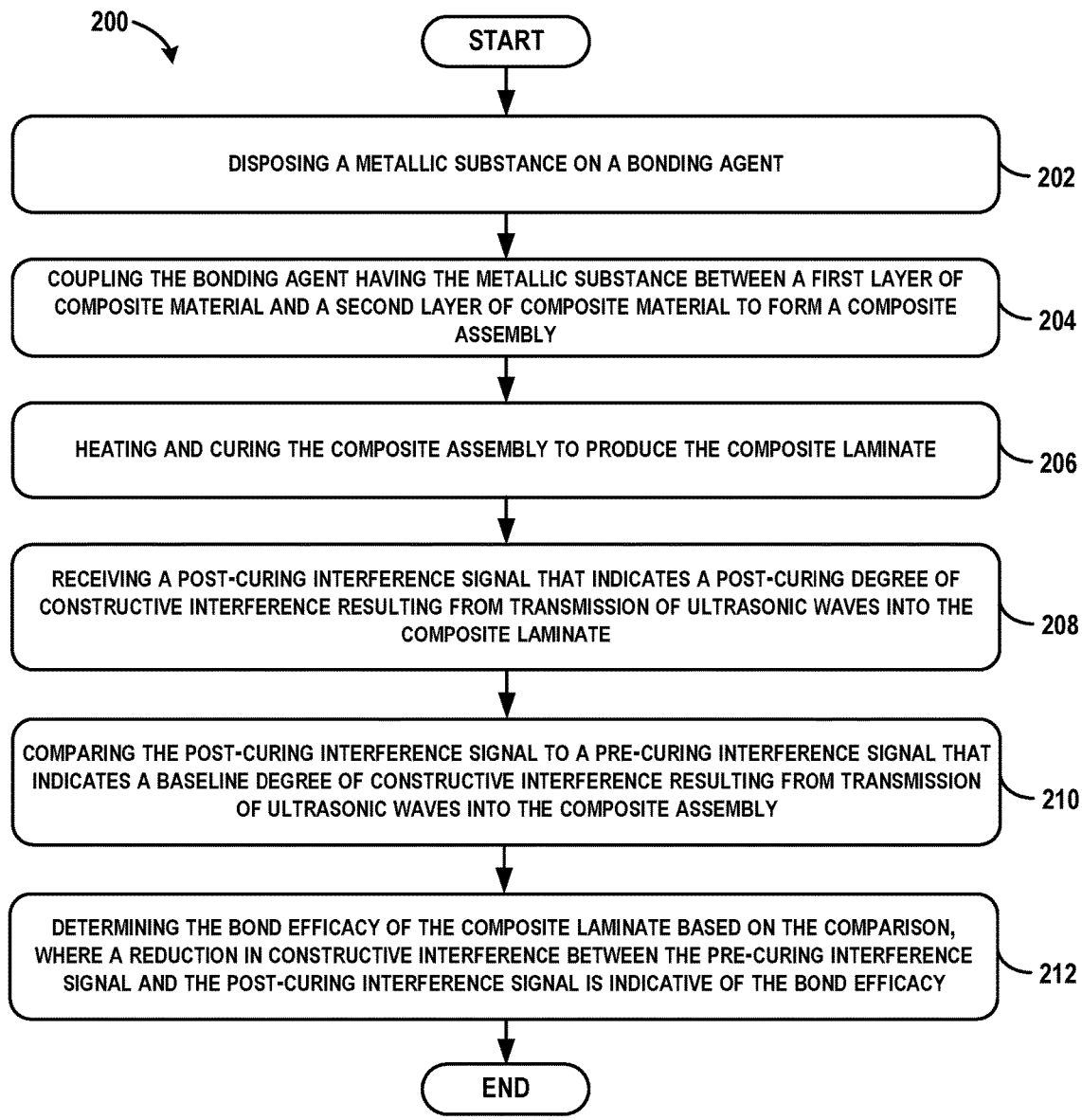
FIG. 7 shows a flowchart of an example method of determining a bonding efficacy of a composite laminate, according to an example implementation.

FIG. 7 shows a flowchart of an example method 200 of determining a bonding efficacy of a composite laminate, according to an example implementation. Method 200 shown in FIG. 7 presents an example of a method that could be used with the composite assembly 120 shown in FIG. 5A and the composite laminate 140 shown in FIG. 5B, for example. Further, devices or systems may be used or configured to perform logical functions presented in FIG. 7. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 200 may include one or more operations, functions, or actions as illustrated by one or more of blocks 202-212. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present examples. In this regard, each block or portions of each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block or portions of each block in FIG. 7, and within other processes and methods disclosed herein, may represent circuitry that is wired to perform the specific logical functions in the process. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 202, the method 200 includes disposing a metallic substance on a bonding agent.

Figure 8:
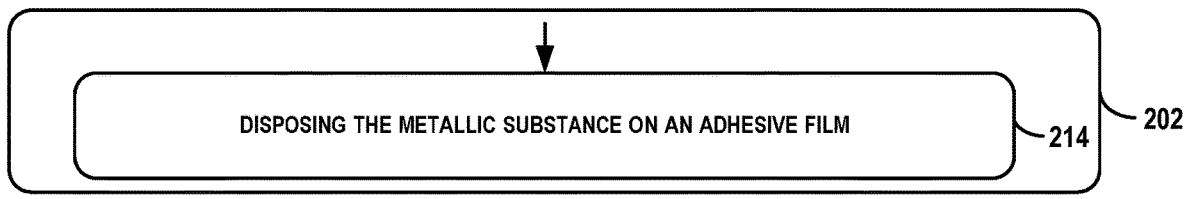
FIG. 8 shows a flowchart of an example method for performing the disposing function of the method of FIG. 7, according to an example implementation.

FIG. 8 shows a flowchart of an example method for performing the disposing as shown in block 202, according to an example implementation. At block 214, functions include disposing the metallic substance on an adhesive film.

Figure 9:
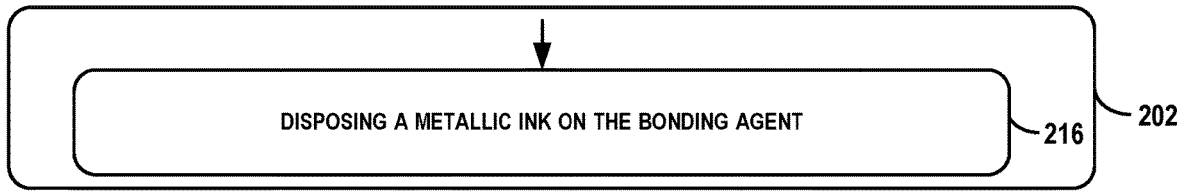
FIG. 9 shows a flowchart of another example method for performing the disposing function of the method of FIG. 7, according to an example implementation.

FIG. 9 shows a flowchart of another example method for performing the disposing as shown in block 202, according to an example implementation. At block 216, functions include disposing a metallic ink on the bonding agent.

Figure 10:
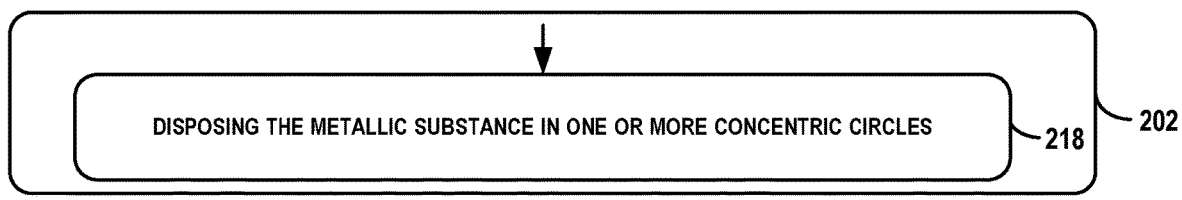
FIG. 10 shows a flowchart of another example method for performing the disposing function of the method of FIG. 7, according to an example implementation.

FIG. 10 shows a flowchart of another example method for performing the disposing as shown in block 202, according to an example implementation. At block 218, functions include disposing the metallic substance in one or more concentric circles.

Figure 11:
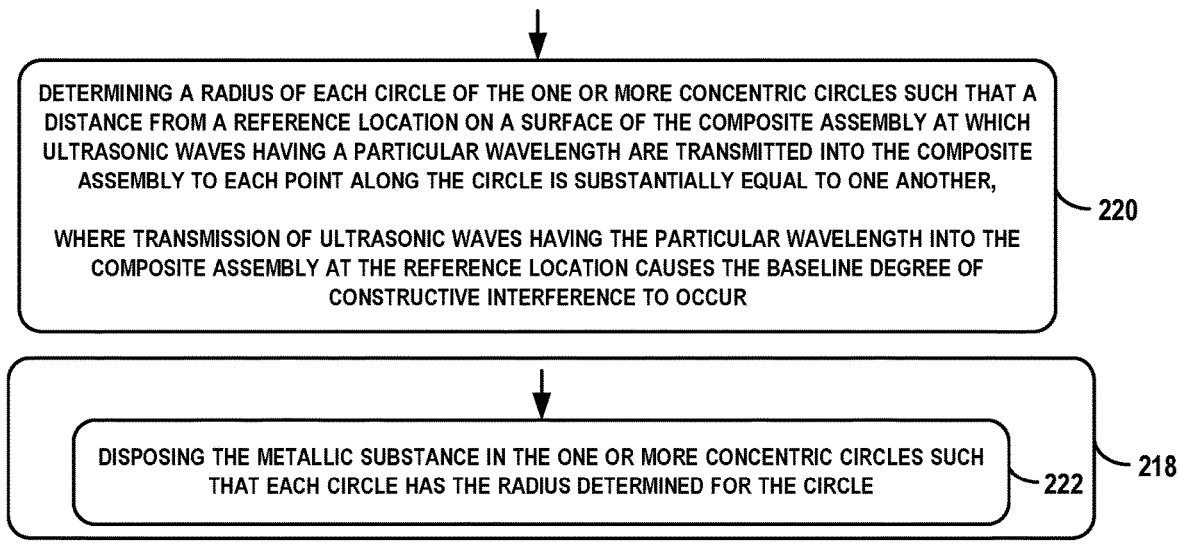
FIG. 11 shows a flowchart of an example method for use with the method shown in FIG. 7, as well as another example method for performing the disposing function of the method of FIG. 7, according to an example implementation.

FIG. 11 shows a flowchart of an example method for use with the method 200, according to an example implementation. At block 220, functions include determining a radius of each circle of the one or more concentric circles such that a distance from a reference location on a surface of the composite assembly at which ultrasonic waves having a particular wavelength are transmitted into the composite assembly to each point along the circle is substantially equal to one another, where transmission of ultrasonic waves having the particular wavelength into the composite assembly at the reference location causes the baseline degree of constructive interference to occur. The radius can be determined based on a thickness of the first layer of composite material, the particular wavelength, and the distance, for example.

Further, FIG. 11 shows a flowchart of another example method for performing the disposing as shown in block 218, according to an example implementation. At block 222, functions include disposing the metallic substance in the one or more concentric circles such that each circle has the radius determined for the circle. Use of the one or more concentric circles, each with a radius determined according to block 220 can maximize the baseline degree of constructive interference.

Figure 12:
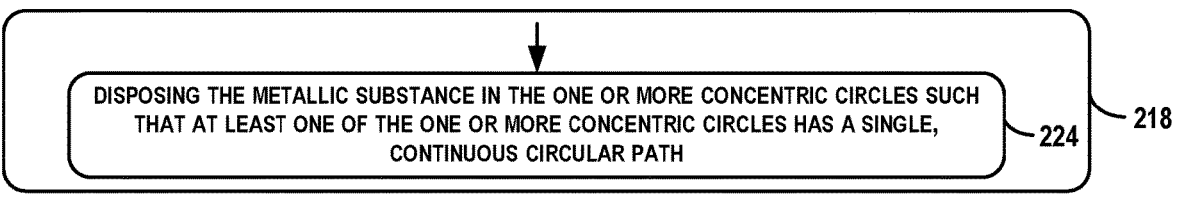
FIG. 12 shows a flowchart of another example method for performing the disposing function of the method of FIG. 7, according to an example implementation.

FIG. 12 shows a flowchart of another example method for performing the disposing as shown in block 218, according to an example implementation. At block 224, functions include disposing the metallic substance in the one or more concentric circles such that at least one of the one or more concentric circles has a single, continuous circular path.

Figure 13:
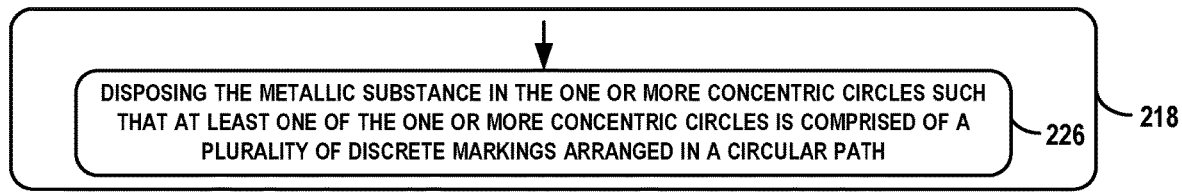
FIG. 13 shows a flowchart of another example method for performing the disposing function of the method of FIG. 7, according to an example implementation.

FIG. 13 shows a flowchart of another example method for performing the disposing as shown in block 218, according to an example implementation. At block 226, functions include disposing the metallic substance in the one or more concentric circles such that at least one of the one or more concentric circles is comprised of a plurality of discrete markings arranged in a circular path.

Figure 14:
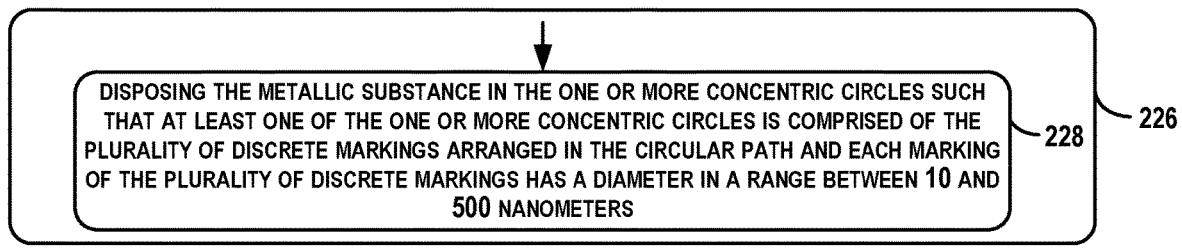
FIG. 14 shows a flowchart of another example method for performing the disposing function of the method of FIG. 7, according to an example implementation.

FIG. 14 shows a flowchart of another example method for performing the disposing as shown in block 226, according to an example implementation. At block 228, functions include disposing the metallic substance in the one or more concentric circles such that at least one of the one or more concentric circles is comprised of the plurality of discrete markings arranged in the circular path and each marking of the plurality of discrete markings has a diameter in a range between 10 and 500 nanometers.

Figure 15:
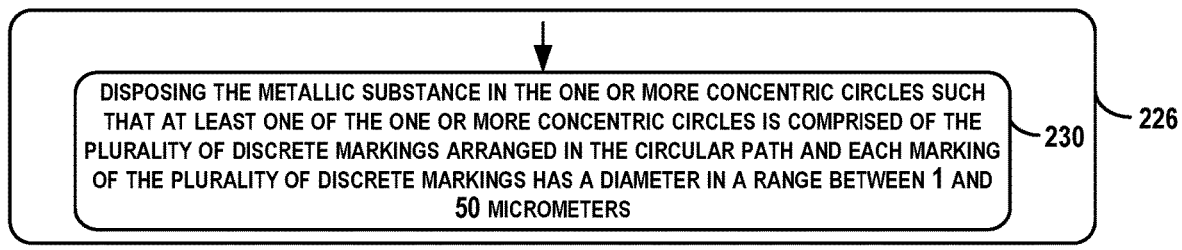
FIG. 15 shows a flowchart of another example method for performing the disposing function of the method of FIG. 7, according to an example implementation.

FIG. 15 shows a flowchart of another example method for performing the disposing as shown in block 226, according to an example implementation. At block 230, functions include disposing the metallic substance in the one or more concentric circles such that at least one of the one or more concentric circles is comprised of the plurality of discrete markings arranged in the circular path and each marking of the plurality of discrete markings has a diameter in a range between 1 and 50 micrometers.

Returning to FIG. 7, at block 204, the method 200 includes coupling the bonding agent having the metallic substance between a first layer of composite material and a second layer of composite material to form a composite assembly.

At block 206, the method 200 includes heating and curing the composite assembly to produce the composite laminate.

At block 208, the method 200 includes receiving a post-curing interference signal that indicates a post-curing degree of constructive interference resulting from transmission of ultrasonic waves into the composite laminate.

At block 210, the method 200 includes comparing the post-curing interference signal to a pre-curing interference signal that indicates a baseline degree of constructive interference resulting from transmission of ultrasonic waves into the composite assembly.

Figure 16:
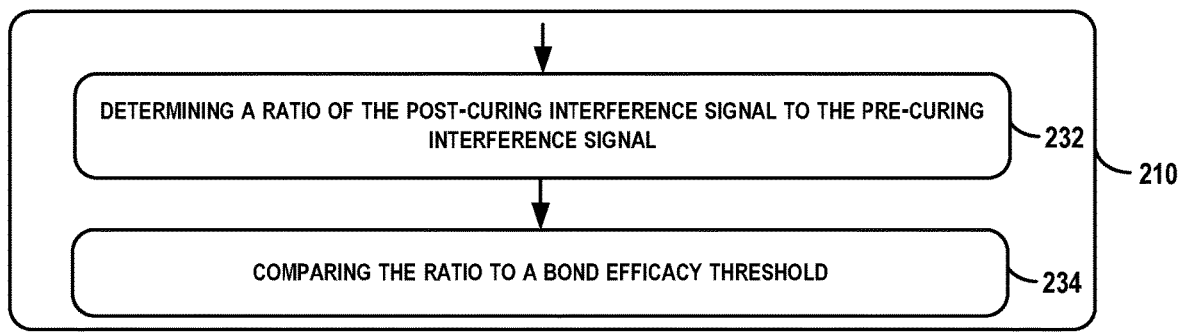
FIG. 16 shows a flowchart of another example method for performing the comparing function of the method of FIG. 7, according to an example implementation.

FIG. 16 shows a flowchart of an example method for performing the comparing as shown in block 210, according to an example implementation. At block 232, functions include determining a ratio of the pre-curing interference signal to the post-curing interference signal. And, at block 234, functions include comparing the ratio to a bond efficacy threshold.

Returning to FIG. 7, at block 212, the method 200 includes determining the bond efficacy of the composite laminate based on the comparison, where a reduction in constructive interference between the pre-curing interference signal and the post-curing interference signal is indicative of the bond efficacy.

Figure 17:
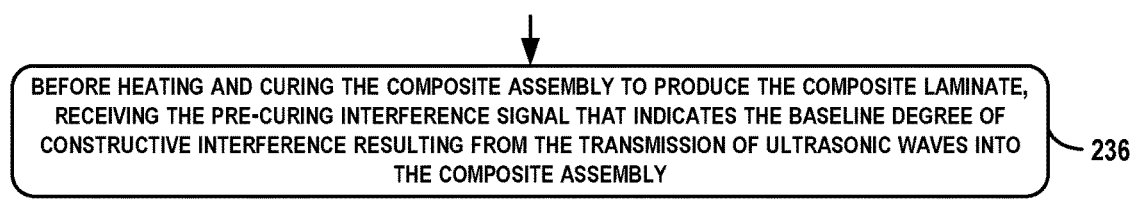
FIG. 17 shows a flowchart of another example method for use with the method shown in FIG. 7, according to an example implementation.

FIG. 17 shows a flowchart of an example method for use with the method 200, according to an example implementation. At block 236, functions include before heating and curing the composite assembly to produce the composite laminate, receiving the pre-curing interference signal that indicates the baseline degree of constructive interference resulting from the transmission of ultrasonic waves into the composite assembly.

By the term "substantially" and "about" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A method of determining bond efficacy of a composite laminate, the method comprising steps of:
   disposing a metallic substance on a bonding agent;
   coupling the bonding agent having the metallic substance between a first layer of composite material and a second layer of composite material to form a composite assembly;
   heating and curing the composite assembly to produce the composite laminate;
   transmitting ultrasonic waves into the composite laminate;
   receiving a post-curing interference signal that indicates a post-curing degree of constructive interference resulting from the step of transmitting the ultrasonic waves into the composite laminate;
   comparing the post-curing interference signal to a pre-curing interference signal that indicates a baseline degree of constructive interference resulting from transmission of ultrasonic waves into the composite assembly; and
   determining the bond efficacy of the composite laminate based on comparing the post-curing interference signal to the pre-curing interference signal, wherein a reduction in constructive interference between the pre-curing interference signal and the post-curing interference signal is indicative of the bond efficacy.

2. The method of claim 1, wherein the step of disposing the metallic substance on the bonding agent comprises a step of disposing the metallic substance on an adhesive film.

3. The method of claim 1, wherein the step of disposing the metallic substance on the bonding agent comprises a step of disposing a metallic ink on the bonding agent.

4. The method of claim 1, wherein the step of disposing the metallic substance on the bonding agent comprises a step of disposing the metallic substance in one or more concentric circles.

5. The method of claim 4, further comprising:
determining a radius of each one of the one or more concentric circles such that distances, from a reference location on a surface of the composite assembly to every point along each one of the one or more concentric circles are substantially equal to one another, and wherein:
transmission of ultrasonic waves, having a particular wavelength, into the composite assembly at the reference location causes the baseline degree of constructive interference to occur, and
the step of disposing the metallic substance in the one or more concentric circles comprises a step of disposing the metallic substance in the one or more concentric circles such that each one of the one or more concentric circles has the radius determined for that one of the one or more concentric circles.

6. The method of claim 4, wherein the step of disposing the metallic substance in the one or more concentric circles comprises a step of disposing the metallic substance such that the metallic substance in at least one of the one or more concentric circles forms a continuous circular region.

7. The method of claim 4, wherein the step of disposing the metallic substance in the one or more concentric circles comprises a step of disposing the metallic substance such that the metallic substance in at least one of the one or more concentric circles forms a plurality of discrete regions arranged in a circular path.

8. The method of claim 7, wherein each of the plurality of discrete regions, arranged in the circular path, has a diameter between 10 and 500 nanometers.

9. The method of claim 7, wherein each of the plurality of discrete regions, arranged in the circular path, has a diameter between 1 and 50 micrometers.

10. The method of claim 1, wherein the step of comparing the post-curing interference signal to the pre-curing interference signal comprises steps of:
determining a ratio of the pre-curing interference signal to the post-curing interference signal; and
comparing the ratio to a threshold of the bond efficacy.

11. The method of claim 1, further comprising a step of:
before the step of heating and curing the composite assembly to produce the composite laminate, receiving the pre-curing interference signal that indicates the baseline degree of constructive interference resulting from the transmission of ultrasonic waves into the composite assembly.

12. A system comprising:
a computing device having a processor and memory that stores instructions, executable by the processor to:
cause a transducer to transmit ultrasonic waves into a composite assembly, wherein the composite assembly comprises a bonding agent inserted between a first layer of composite material and a second layer of composite material, and wherein a metallic substance is disposed on the bonding agent;
receive a pre-curing interference signal that indicates a baseline degree of constructive interference resulting from the ultrasonic waves being transmitted into the composite assembly;
cause the transducer to transmit ultrasonic waves into a composite laminate produced by heating and curing the composite assembly;
receive a post-curing interference signal that indicates a post-curing degree of constructive interference resulting from transmission of ultrasonic waves into the composite laminate;
compare the post-curing interference signal to the pre-curing interference signal; and
determine a bond efficacy of the composite laminate based on comparing the post-curing interference signal to the pre-curing interference signal, wherein a reduction in constructive interference between the pre-curing interference signal and the post-curing interference signal is indicative of the bond efficacy.

13. The system of claim 12, wherein the metallic substance is disposed on the bonding agent in one or more concentric circles.

14. The system of claim 13, wherein:
the instruction to cause the transducer to transmit ultrasonic waves into the composite assembly comprises an instruction to cause the transducer to transmit ultrasonic waves having a particular wavelength into the composite assembly at a reference location on a surface of the composite assembly,
a radius of each one of the one or more concentric circles is selected such that distances from the reference location to every point along each one of the one or more concentric circles are substantially equal to one another, and
the instruction to cause the transducer to transmit ultrasonic waves having the particular wavelength into the composite assembly at the reference location causes the baseline degree of constructive interference to occur.

15. The system of claim 13, wherein the metallic substance in at least one of the one or more concentric circles forms a continuous circular region.

16. The system of claim 13, wherein the metallic substance in at least one of the one or more concentric circles forms a plurality of discrete regions, arranged in a circular path.

17. The system of claim 12, wherein the instruction to compare the post-curing interference signal to the pre-curing interference signal comprises instructions to:
determine a ratio of the pre-curing interference signal to the post-curing interference signal; and
compare the ratio to a threshold of the bond efficacy.

18. A non-transitory computer readable medium having stored thereon instructions that, when executed by one or more processors of a computing device, cause the computing device to perform functions, comprising:
causing a transducer to transmit ultrasonic waves into a composite assembly, wherein the composite assembly comprises a bonding agent inserted between a first layer of composite material and a second layer of composite material, and wherein a metallic substance is disposed on the bonding agent;
receiving a pre-curing interference signal that indicates a baseline degree of constructive interference resulting from ultrasonic waves being transmitted into the composite assembly;
causing the transducer to transmit ultrasonic waves into a composite laminate produced by heating and curing the composite assembly;
receiving a post-curing interference signal that indicates a post-curing degree of constructive interference resulting from the transmission of ultrasonic waves into the composite laminate;
comparing the post-curing interference signal to the pre-curing interference signal; and determining a bond efficacy of the composite laminate based on comparing the post-curing interference signal to the pre-curing interference signal, wherein a reduction in constructive interference between the pre-curing interference signal and the post-curing interference signal is indicative of the bond efficacy.

19. The non-transitory computer readable medium of claim 18, wherein:

the metallic substance is disposed on the bonding agent in one or more concentric circles, the function of causing the transducer to transmit ultrasonic waves into the composite assembly comprises a function of causing the transducer to transmit ultrasonic waves having a particular wavelength into the composite assembly at a reference location on a surface of the composite assembly, a radius of each one of the one or more concentric circles is selected such that distances from the reference location to every point along each one of the one or more concentric circles are substantially equal to one another, and the function of causing the transducer to transmit ultrasonic waves having the particular wavelength into the composite assembly at the reference location causes the baseline degree of constructive interference to occur.

20. The non-transitory computer readable medium of claim 18, wherein the function of comparing the post-curing interference signal to the pre-curing interference signal comprises functions of:

determining a ratio of the pre-curing interference signal to the post-curing interference signal; and comparing the ratio to a threshold of the bond efficacy.

\* \* \* \* \*